United States Patent [19]  [11] 4,381,536
Ross et al.  [45] Apr. 26, 1983

[54] LOW VOLTAGE ELECTROLYTIC CAPACITOR

[75] Inventors: Sidney D. Ross, Williamstown; Manuel Finkelstein, North Adams, both of Mass.

[73] Assignee: Sprague Electric Company, North Adams, Mass.

[21] Appl. No.: 230,834

[22] Filed: Feb. 2, 1981

[51] Int. Cl.³ .............................................. H01G 9/02
[52] U.S. Cl. .................................... 361/433; 252/62.2
[58] Field of Search ........................ 252/62.2; 361/433

[56] References Cited

U.S. PATENT DOCUMENTS

| | | | |
|---|---|---|---|
| 2,871,425 | 1/1959 | Burnham | 361/433 |
| 2,923,867 | 2/1960 | Robinson | 361/433 |
| 2,932,153 | 4/1960 | Bernard et al. | 361/433 |
| 2,941,946 | 6/1960 | Ross et al. | 252/62.2 |
| 3,307,085 | 2/1967 | Ross | 361/433 |

Primary Examiner—Jack Cooper

[57] ABSTRACT

An aluminum electrolytic capacitor suitable for low-voltage use contains as electrolyte ammonium difluoroacetate dissolved in either ethylene glycol or an ethylene glycol-butyrolactone mixture both containing water. The electrolyte has a room-temperature resistivity of 150 ohm-cm or less and a −40° C. resistivity of less than 11,000 ohm-cm.

5 Claims, 2 Drawing Figures

LOW VOLTAGE ELECTROLYTIC CAPACITOR

BACKGROUND OF THE INVENTION

This invention relates to an aluminum electrolytic capacitor suitable for low-voltage use that contains ammonium difluoroacetate dissolved in either ethylene glycol or an ethylene glycol-butyrolactone mixture both containing water and having a room-temperature resistivity of 150 ohm-cm or less and a −40° C. resistivity of less than 11,000 ohm-cm.

Low-voltage capacitors, and particularly those of 16 volt or lower rating, need to retain at least 70% of available capacity at −40° C. To ensure this capacity retention, it is necessary for the electrolyte used to have a room-temperature resistivity below 300 ohm-cm and a −40° C. resistivity below 12,500 ohm-cm. Since the −40° C. resistivity is the critical parameter, an electrolyte with −40° C. resistivity values of less than 11,000 ohm-cm and particularly 8000 ohm-cm or lower is desirable to provide a capacitor that will retain 70% capacitance at this low temperature.

Amine salts of fluoroacetic acid have been used as solutes in electrolytes with room-temperature resistivities of approximately 200 ohm-cm for electrolytic capacitors for low-voltage service. The free acids have also been used.

SUMMARY OF THE INVENTION

A low-voltage capacitor that retains at least 70% capacitance at −40° C. features as electrolyte ammonium difluoroacetate dissolved in ethylene glycol or an ethylene glycol-butyrolactone mixture both containing water. This electrolyte has a room-temperature resistivity of 150 ohm-cm or less and a −40° C. resistivity of less than 11,000 ohm-cm and enables the capacitor to retain 70% capacitance at −40° C.

It was hypothesized that, for a given solvent system, there is a relationship between the acid strength of the acid from which the salt solute is prepared and the resistivity of the electrolyte containing that solute at a given salt concentration. If the acid from which the salt is prepared is too strong, the ability to support anodic oxidation, necessary to repair film damage during capacitor operation, will be impaired as free acid will be liberated at the anodization site and overly strong acids will attack the oxide film instead of repairing the damage.

In order to obtain optimum conductivities, ammonium salts of moderately strong acids were prepared, despite the fact that the amine salts are more stable to amide formation. The acids varied in strength from glycolic ($K_a = 1.47 \times 10^{-4}$) to trifluoroacetic ($K_a = 5.88 \times 10^{-1}$), a prior art acid.

The ammonium salt of glycolic acid as a 2M solution in an equal volume mixture of ethylene glycol and butyrolactone containing 8% water had satisfactory room-temperature resistivity and formation voltage, 171 ohm-cm and 144 V respectively, but an unsatisfactory −40° C. resistivity for the present purposes, about 13,500 ohm-cm.

As a contrast, the ammonium salt of the strongest acid, trifluoroacetic, in the same solvent had satisfactory room-temperature and −40° C. resistivities, 110 and 2200 ohm-cm respectively, but sustained formation to only 8 V.

The ammonium salt of cyanoacetic acid, in between the above in acid strength, had good room-temperature and −40° C. resistivities in a 50—50 butyrolactone-ethylene glycol mixture, 140 and 4750 ohm-cm respectively, and sustained formation to 78 V. However, it underwent rapid decarboxylation at 85° C. and exploded when tested in sealed tubes within a few hours at this temperature.

The ammonium salt of monofluoroacetic acid, of about the same acid strength as cyanoacetic acid, in the same solvent, also had satisfactory room-temperature and −40° C. resistivities and formation voltage, 153 ohm-cm, 6240 ohm-cm, and 87 V respectively, and was stable on heating at 85° C. However, this salt is extremely toxic and cannot be recommended for use.

The ammonium salt of difluoroacetic acid is not toxic and has satisfactory properties for the present use. It is the preferred salt.

BRIEF DESCRIPTION OF THE DRAWING

Referring to FIG. 1, wound capacitor section 10 consists of anode foil 11 of a valve metal, preferably aluminum, having on its surface an insulating oxide barrier layer. Cathode foil 13 may also be a valve metal. Electrolyte absorbent films 12 and 14, preferably paper, are positioned between the anode and cathode foils. Tabs 15 and 16 are connected to electrodes 11 and 13 respectively to provide for connection of the electrodes to leads. When completely wound, section 10 is impregnated with electrolyte (not shown).

FIG. 2 shows a cross-section of an axial capacitor in which the cathode tab 16 of capacitor section 10 is welded at 22 to the bottom of container 25 and it in turn is welded at 23 to cathode lead 24. Anode tab 15 is welded to the bottom portion 17 of plug 18 positioned in bushing 19 and welded at 20 to anode lead 21. Electrolyte (not shown) impregnates section 10.

DESCRIPTION OF THE PREFERRED EMBODIMENTS

Figure 1:
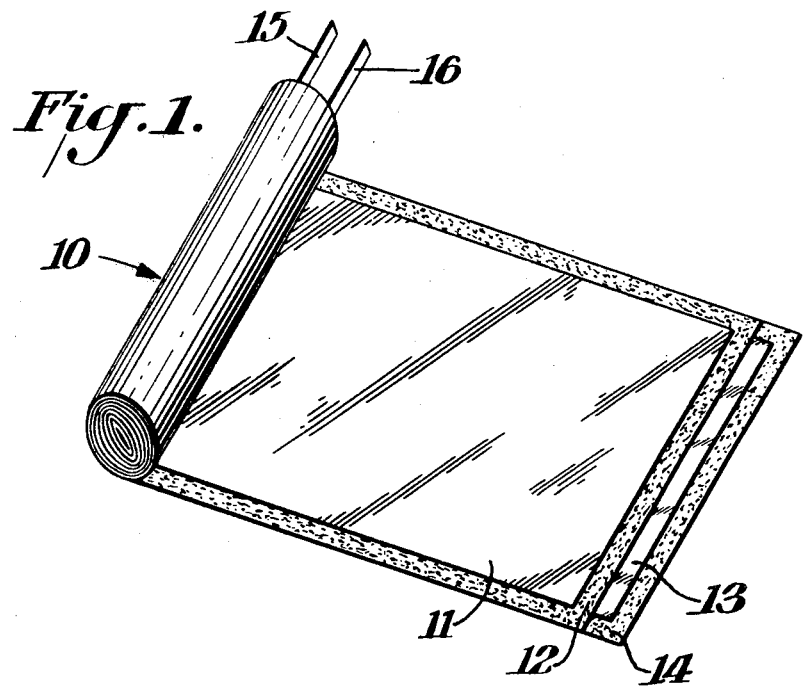
FIG. 1 shows a wound capacitor section partially unrolled.
Figure 2:
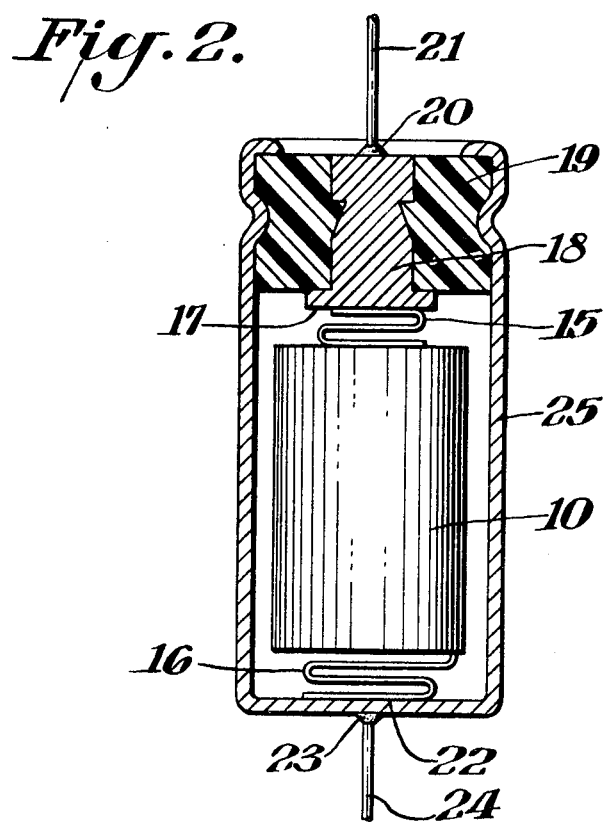
FIG. 2 is a cross-section of a capacitor containing a wound section.

A range of electrolyte formulations were made and evaluated using ammonium difluoroacetate as solute in ethylene glycol or an ethylene glycol-butyrolactone mixture. The water content was varied between 1 and 20 wt %. With water content varying between 3 wt % and 19 wt % as the preferred limits, it is still possible to have the desired room-temperature resistivity of 150 ohm-cm or less and a −40° C. resistivity of less than 11,000 ohm-cm to ensure 70% capacitance retention at −40° C.

The solute concentration that provided the above characteristics was found to be about 12 to 15 wt % solute, an unexpected result particularly in view of the low resistivities found. While an ammonium salt is generally more conducting (lower resistivity) than an amine salt for a given amount of salt, it was not expected to be so much more conducting that about 33–50% less salt can be used and still obtain resistivities substantially below that of prior art amine salts.

EXAMPLE 1

A representative group of electrolyte formulations are given below illustrating this invention. The solute is ammonium difluoroacetate, and its amount is given in weight percent; the relative amount of solvent is in weight percent; and the amount of water is in weight percent. Resistivities are given in ohm-cm, and formation voltages are for aluminum formation.

In the first two formulations, the solvent was 50 vol % ethylene glycol and 50 vol % butyrolactone; in the remaining formulations, the solvent is pure ethylene glycol.

TABLE 1

| Salt | Wt % solvent | Water | Resistivity 25° C. | Resistivity −40° C. | Formation Voltage, V |
|------|--------------|-------|--------------------|---------------------|----------------------|
| 14.6% | 81.8% | 3.6% | 120 | 3738 | 20 |
| 14.0% | 78.0% | 8.0% | 98 | 3208 | 47 |
| 14.3% | 78.6% | 7.1% | 130 | 10,888[a] | — |
| 13.3% | 73.4% | 13.3% | 100 | 7150[a] | — |
| 12.5% | 68.7% | 18.8% | 85 | 5688[b] | 44 |

[a]measured at −41° C.
[b]measured at −42° C.

Two of the formulations, the second and fifth have excellent room-temperature and −40° C. resistivities to ensure 70% capacitance retention at −40° C. combined with more than adequate formation voltages for low voltage capacitors.

What is claimed is:

1. An electrolytic capacitor comprising a plurality of spaced aluminum electrodes, at least one of which is coated with a barrier layer dielectric oxide, interleaved spacers, and an electrolyte in contact therewith, said electrolyte comprising about 12–15 wt % of ammonium difluoroacetate salt as solute dissolved in a solvent selected from the group consisting of ethylene glycol and ethylene glycol-butyrolactone mixture and containing about 3–19 wt % water and said electrolyte having a room-temperature resistivity of 150 ohm-cm or lower and a −40° C. resistivity of less than 11,000 ohm-cm to provide a low-voltage capacitor that retains at least 70% capacitance at −40° C.

2. A capacitor according to claim 1 wherein said solvent is a mixture of ethylene glycol and butyrolactone.

3. A capacitor according to claim 2 wherein said solvent mixture is an equal volume mixture.

4. A capacitor according to claim 1 wherein said electrolyte comprises ammonium difluoroacetate dissolved in ethylene glycol and water and having a room temperature resistivity of 100 ohm-cm or less and a −40° C. resistivity of less than 7200 ohm-cm.

5. A capacitor according to claim 1 wherein said electrolyte comprises ammonium difluoroacetate dissolved in a mixture of equal volumes of ethylene glycol and butyrolactone and containing water and having a room temperature resistivity of 120 ohm-cm or less and a −40° C. resistivity of less than 3800 ohm-cm.

* * * * *